Nov. 29, 1966  C. E. DOWNER ET AL  3,288,407
GROMMETS

Filed Feb. 7, 1966  2 Sheets-Sheet 2

INVENTORS
Charles Edward Downer
Alfred Edward Charles Piper
by Philip E. Parker
Attorney.

United States Patent Office 3,288,407
Patented Nov. 29, 1966

3,288,407
GROMMETS
Charles Edward Downer, Ruislip, and Alfred Edward Charles Piper, Hillingdon, England, assignors to United-Carr Incorporated, Boston, Mass., a corporation of Delaware
Filed Feb. 7, 1966, Ser. No. 525,627
Claims priority, application Great Britain, Feb. 8, 1965, 5,349/65
7 Claims. (Cl. 248—56)

The present invention relates to an improved one-piece grommet which is particularly but not exclusively suitable for holding a cable in an apertured support so as to resist movement of the cable in one or both directions through the aperture and relieve any strains placed on the cable from one or other side of the support.

It is an object of the present invention to provide a grommet which will hold a cable in an aperture in a panel and provide strain relief for the cable and which also obviates the necessity to bend or kink the cable in any way.

It is a further object of the invention to provide a grommet in which the holding strength and characteristics of the grommet can be varied by small variations in the shape and dimensions of a part of the grommet.

It is a further object of the invention to provide a grommet which is cheap to mass produce and easy to assemble on a work structure.

According to the invention there is provided a one-piece grommet moulded from a synthetic plastics material and adapted to hold a cable in an apertured support, the grommet comprising a head and a shank, the head having an abutment shoulder facing the shank and adapted to bear against the apertured support and the head and shank being divided lengthwise into two similar portions, each of said similar portions comprising a head portion and a shank portion integral therewith, the shank portions being joined at the ends thereof remote from the head by a flexible web of material which allows the two said similar portions to pivot about an axis transverse to the axis of the shank for clamping engagement on opposite sides of the cable when the grommet and cable are engaged in the aperture in the support, each shank portion having an internal surface provided with a projection adapted to engage a cable clamped between the two said portions to resist lengthwise movement of the cable through the grommet.

Preferred forms of the invention will now be described with reference to the accompanying diagrammatic drawings, in which.

Figure 2:
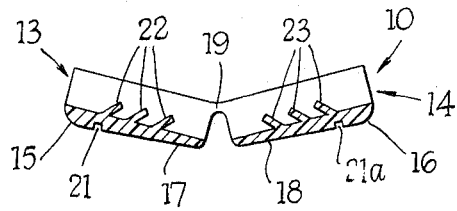
FIGURE 2 is a section taken on the line II—II of FIGURE 1.
Figure 1:
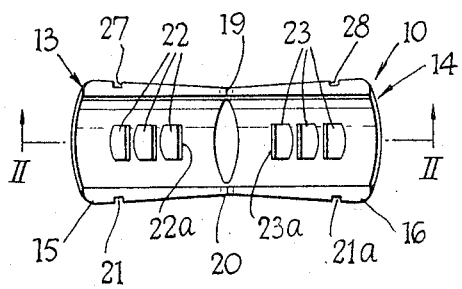
FIGURE 1 is a plan view of a grommet.
Figure 3:
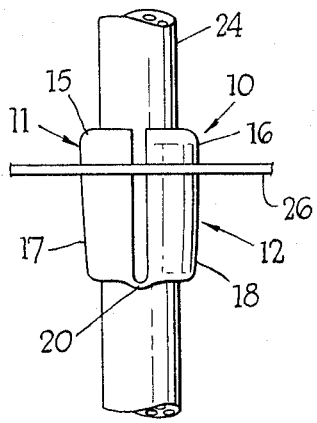
FIGURE 3 is an elevation showing a cable held in an apertured support by the grommet of FIGURE 1.

In FIGURES 1 to 3 a one-piece grommet is indicated generally at 10.

Figure 4:
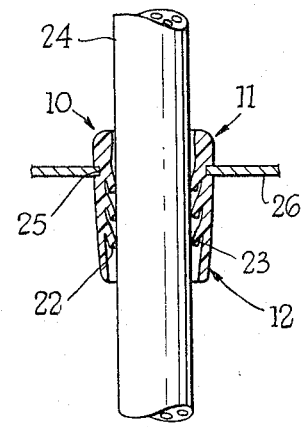
FIGURE 4 is a part sectional elevation similar to FIGURE 3.

The grommet 10 is moulded to the shape shown, for instance by injection moulding, from any suitable synthetic plastics material and comprises a head, which is indicated generally at 11 in FIGURES 3 and 4 and a shank, which is indicated generally at 12.

The head 11 and shank 12 of the grommet 10 are divided lengthwise into two similar portions 13 and 14 each of which comprises a head portion 15 and 16 respectively integral with a shank portion 17 and 18 respectively.

The two portions 13 and 14 are joined at the end of the shank remote from the head by two flexible webs of material 19 and 20 which enable the two portions to be pivoted about an axis transverse to the axis of the shank 12 into a generally parallel relation.

The two shank portions 17 and 18 are formed with grooves 21, 21a respectively adjacent the head portions 15 and 16, the grooves 21 and 21a being adapted, in use, to accommodate the rim of a circular aperture in a panel and providing shoulders 27 and 28 respectively facing the head 11 and adapted to engage the undersurface of a panel.

The internal surfaces of the two portions 13 and 14 are concave and together define a generally cylindrical passage through the grommet 10 when the two portions are pivoted at the webs 19 and 20 into generally parallel relation.

The shank portion 17 is provided with three similar projections, in the form of substantially flat lugs 22, which extend from the internal surface of the shank portion and which are similarly inclined to the axis of the shank 12 away from the head portion 15.

The shank portion 18 is formed with three lugs 23 similar to the lugs 22 and both the lugs 22 and 23 are formed with end edges 22a and 23a respectively which extend transversely to the axis of the shank.

The grommet 10 is used, as shown in FIGURES 3 and 4 to hold a cable 24 in position through a circular aperture 25 in a support panel 26.

The cable 24 is first threaded through the aperture 25 and the grommet 10 threaded over the cable and brought up to the panel 26. The two portions 13 and 14 of the grommet are then pivoted about the webs 19 and 20 into a generally parallel relation so that they partly encircle the cable 24 and finally, the grommet 10 is forced, shank first, into the aperture 25 until the rim of the aperture is seated in the groove 21.

When the grommet 10 and cable 24 are engaged in the panel 26 the two portions 13 and 14 of the grommet are clamped in tight frictional engagement between the rim of the aperture and the cable and the lugs 22 and 23 are held in engagement with the cable and resist movement of the cable relative to the grommet. The head 11 of the grommet is engaged against one surface of the panel 26 and the shoulders 27, 28 are engaged against the other surface of the panel and thus the grommet is securely clamped in the aperture 25. The angle of inclination of the lugs 22 and 23 is such that they provide greater resistance to movement of the cable 24 through the grommet in a direction from the shank towards the head than in the opposite direction.

Any number of lugs may be provided on each portion of the grommet to increase or reduce the resistance to movement of the cable and their angle of inclination and direction may be varied to suit any given requirement. For instance some of the lugs on each portion may be so inclined that they resist movement of the cable in one direction while the other lugs are so inclined that they resist movement of the cable in the opposite direction.

Both the head 11 and the shank 12 are externally generally circular in shape but they may be externally non-circular if required. For instance the shank may be externally rectangular in cross-section for engagement in a rectangular aperture in a support panel.

The head of the grommet may be of larger external cross-section than the shank which need not then be provided with an external groove the grommet then being held against withdrawal from the aperture by friction.

Figure 6:
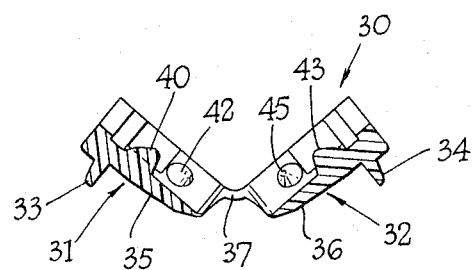
FIGURE 6 is a section taken on the line VI—VI of FIGURE 5.
Figure 5:
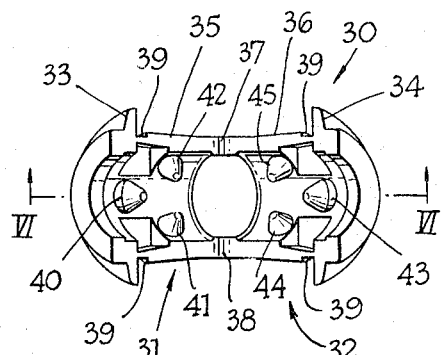
FIGURE 5 is a plan view of a modification of the grommet of FIGURES 1 to 3.

A further modification of the grommet 10 is indicated at 30 in FIGURES 5 and 6.

The grommet 30 comprises a head and shank, not referenced, which are divided lengthwise into two portions 31 and 32, each comprising a head portion 33 and 34 respectively, integral with shank portions 35 and 36 respectively and joined at the end of the shank remote from the head by webs of material 37 and 38 which allow the two portions to be pivoted into generally parallel relation.

The head of the grommet 30 is externally and internally circular in section and the shank is externally rectangular in section over the whole of its length and internally concave and rectangular in section adjacent the head and circular in section over the remainder of its length.

Opposite sides of each shank portion 35 and 36 are provided with shoulders 39 so that, when the two portions 31 and 32 are pivoted together, two opposite sides of the shank of the grommet are provided with shoulders facing the head of the grommet for engagement against the undersurface of a panel.

The shank portion 35 is provided with three internal projections in the form of generally conical protuberances 40, 41, 42 which are arranged in an approximately equilateral triangular formation on the internal surface of the shank portion. The protuberance 40 is approximately in the shape of an obliquely truncated cone and projects into the passage through the grommet towards the end of the shank when the two portions 31 and 32 are pivoted together. The protuberances 41 and 42 are also in the form of obliquely truncated cones and are so oriented that they are inclined away from the head of the grommet and towards each other.

The shank portion 36 is provided with three projections in the form of generally conical protuberances 43, 44 and 45 which are similar to the protuberances 40, 41 and 42 respectively.

The grommet 30 is used in the same manner as the grommet 10 to hold a cable in position through an aperture in a panel and it will be seen that the resistance which the protuberances on the shank portions 35 and 36 offer to movement of the cable through the grommet when the two portions 31 and 32 are clamped against the cable can be varied by altering the length and the angle of inclination of the protuberances.

The grommet 30 which has an externally rectangular section shank is intended for use in a rectangular aperture but it will be appreciated that the shank of the grommet 30 may be externally circular in section if required.

In both the grommet 10 and the grommet 30 the two relatively pivotable portions are hinged together by two webs of material, one on each side of the shank but only one such web of material need be provided at one side only of the shank.

It will be understood that further modifications may be made to the embodiments described above without departing from the spirit and scope of the invention which is best defined by the following claims.

What we claim is:

1. A one-piece grommet moulded from a synthetic plastics material and adapted to hold a cable in an apertured support the grommet comprising a head and a shank, the head having an abutment shoulder facing the shank and adapted to bear against the apertured support and the head and shank being divided lengthwise into two similar portions, each of the said similar portions comprising a head portion and a shank portion integral therewith, the shank portions being joined at the ends thereof remote from the head by a flexible web of material which allows the two said portions to pivot about an axis transverse to the axis of the shank for clamping engagement on opposite sides of the cable when the grommet and cable are engaged in the aperture in the support each shank portion having an internal surface provided with a projection adapted to engage a cable clamped between the two said portions to resist lengthwise movement of the cable through the grommet.

2. A grommet as claimed in claim 1 in which each of said similar portions is internally concave, the two said portions together defining a substantially linear passageway through the grommet adapted to receive a cable.

3. A grommet as claimed in claim 2, in which each shank portion is provided with a shoulder spaced from and facing the head portion integral therewith.

4. A grommet as claimed in claim 3, in which the projection on each shank portion is a substantially flat lug the transverse end edge of which is aligned transversely to the axis of the grommet.

5. A one-piece grommet moulded from a synthetic plastics material and adapted to hold a cable in an apertured support, the grommet comprising a head and a shank, the head having a shoulder facing the shank and adapted to abut a surface of the apertured support and the head and the shank being divided lengthwise into two similar portions, each of said similar portions comprising a head portion and a shank portion integral therewith, the two shank portions being joined at the ends thereof remote from the head of the grommet by two flexible webs of material which allow the said two portions of the grommet to be pivoted into parallel relation around the cable, each shank portion having an internal surface, the said internal surfaces defining a generally linear passage through the grommet for the reception of the cable and there being provided a number of generally flat transversely oriented lugs projecting from the internal surface of each shank portion, the said lugs being inclined to the axis of the shank portions and adapted to engage the cable when the cable is clamped between the two portions of the grommet to resist relative movement between the cable and the grommet.

6. A one-piece grommet moulded from a synthetic plastics material and adapted to hold a cable in an apertured support the grommet comprising a head and a shank, the head having a shoulder facing the shank and adapted to abut a surface of the apertured support and the head and the shank being divided lengthwise into two similar portions, each of said similar portions comprising a head portion and a shank portion integral therewith, the two shank portions being joined at the ends thereof remote from the head of the grommet by two flexible webs of material which allow the said two portions of the grommet to be pivoted into parallel relation around the cable, each shank portion having an internal surface, the said internal surfaces defining a generally linear passage through the grommet for the reception of the cable and there being provided a number of generally conical projections on the internal surface of each shank portion, the said projections being adapted to engage the cable when the cable is clamped between the two portions of the grommet to resist relative movement between the cable and the grommet.

7. A grommet as claimed in claim 6, in which some of the projections are obliquely truncated cones inclined to the axis of the shank of the grommet whereby the resistance to relative movement of the cable and the grommet provided by the projections can be varied by altering the orientation of the said obliquely truncated projections.

References Cited by the Examiner
UNITED STATES PATENTS

| | | | |
|---|---|---|---|
| 1,721,119 | 7/1929 | Houghton | 248—56 X |
| 2,141,878 | 12/1938 | Roby | 248—56 |
| 2,283,899 | 5/1942 | Baker | 248—56 |
| 2,430,809 | 11/1947 | Flora et al. | 248—56 |

CLAUDE A. LE ROY, *Primary Examiner.*